United States Patent Office 3,197,239
Patented July 27, 1965

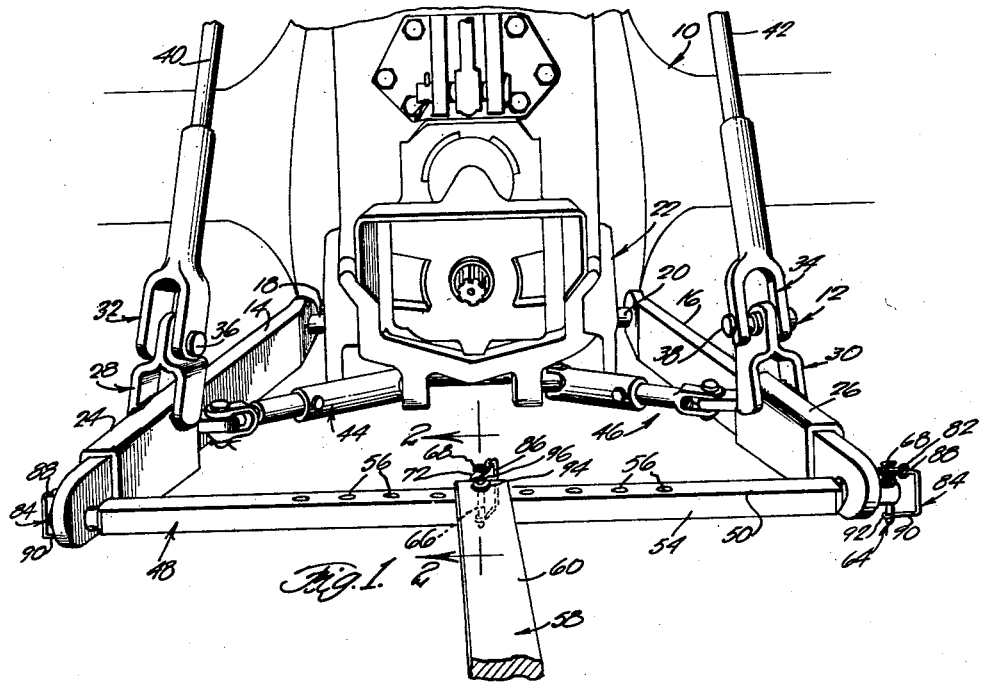
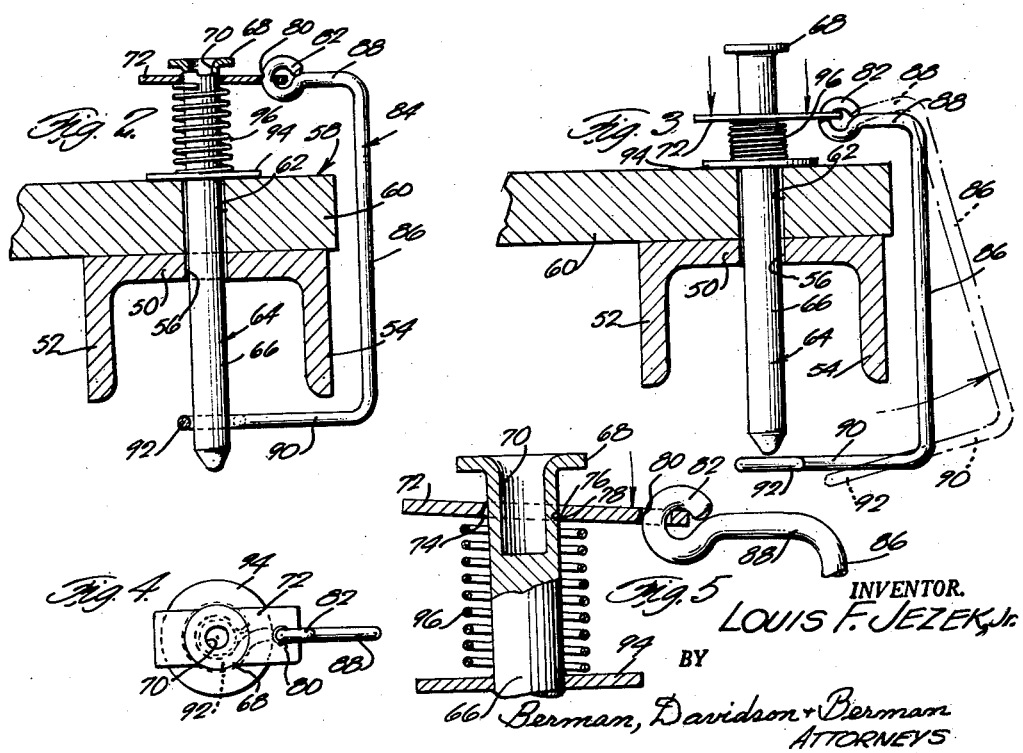

3,197,239
DRAWBAR LOCK PIN SAFETY ATTACHMENT
Louis F. Jezek, Jr., Rte. 3, P.O. Box 204, Temple, Tex.
Filed Sept. 11, 1964, Ser. No. 395,682
4 Claims. (Cl. 280—515)

This invention relates to the general field of safety devices and, more specifically, to an attachment for a coupler between two moving vehicles.

It is common knowledge that many accidents have occured as the result of the displacement of the conventional pin used in the connection of the tongue of a drawn vehicle with the drawbar of the towing vehicle which may comprise a tractor, automobile, or other similar types of automotive vehicles. The displacement of the pin is usually the consequence of frictional forces which work thereon that tend to work the pin upwardly to the extent that the tongue and the drawbar become disconnected.

Thus, one of the primary objects of this invention is to provide safety locking means for releasably securing the locking pin connecting the drawbar of a driven vehicle to the tongue of a drawn or towed vehicle.

Another object of this invention is to provide a releasable hold-down device for the aforementioned locking pin, the device including a lock plate surrounding the pin, the plate being disposed in spring-biased canted position relative to the longitudinal axis of the pin and means connected to the plate and cooperating with the pin to prevent movement of the plate out of its canted position whereby the same would be permitted longitudinal movement relative to the plate.

This invention contemplates, as a still further object thereof, the provision of a safety attachment of the type generally referred to supra, the attachment being inexpensive to manufacture, non-complex in construction and assembly, and which is durable in use.

Other and further objects and advantages of the instant invention will become more manifest from a consideration of the following specification when read in conjunction with the annexed drawing, in which:

FIGURE 1 is a fragmentary rear end perspective view of a conventional tractor and illustrating the conventional connector frame projecting rearwardly therefrom and showing a practical application of a drawbar lock pin safety attachment constructed according to this invention;

FIGURE 2 is an enlarged fragmentary detail cross-sectional view illustrating the details of the component elements of the safety attachment relative to the lock pin, the elements and pin being shown in their respective operative positions;

FIGURE 3 is a cross-sectional view similar to FIGURE 2 and being partly in side elevation, this view illustrating in full lines positions of the safety attachment relative to the locking pin just prior to rendering the attachment inoperative, and also shows, in dotted lines, the movement of one element of the attachment in such a manner as to completely render the attachment inoperative;

FIGURE 4 is a top plan view of the attachment; and

FIGURE 5 is an enlarged fragmentary detail cross-sectional view of the locking pin and its safety attachment, the latter being shown in its operative position.

Referring now more specifically to the drawing, reference numeral 10 designates, in general, the rear end of the chassis of a conventional tractor. Reference numeral 12 indicates, generally, the usual connector frame which includes the elongated substantially rectangular tension links 14, 16 pivotally connected at one of their ends, respectively, on shafts 18, 20, the latter comprising extensions of the chassis 22. As is seen in FIGURE 1, the tension links 14, 16 extend through elongated substantially hollow rectangular sleeves 24, 26, the sleeves each having hitches 28, 30, respectively, to which is connected the clevis element 32, 34 as be pivot pins 36, 38. The clevis elements 36, 38 connect through links 40, 42 with the usual hydraulic lift shaft (not shown). The customary adjusting and stabilizing linkage 44, 46 connects the tension links 14, 16 with the chassis 22, and the usual drawbar 48 is carried by the tension links 14, 16 at and proximate their respective outer ends. The drawbar 48 is conventional in construction and comprises an inverted substantially U-shaped channel member including an elongated bight 50 from the longitudinally-extending marginal edges of which depend the side flanges 52, 54. The bight 50 is provided with a plurality of adjustment openings 56, all in the usual manner. The elements above described are conventional in the art as is the tongue 58 of the towed vehicle (not shown). The tongue 58 comprises an elongated substantially rectangular main body portion 60 having a transversely-extending bore 62 at the outer end thereof, the bore 62 and one of the openings 56 being adapted for alignment to receive a lock pin 64 therethrough to couple the tongue 58 with the drawbar 48.

Making specific reference to FIGURES 2 to 5, inclusive, the lock pin 64 is shown as extending through the bore 62 and into one of the openings 56 and is seen to comprise an elongated cylindrical main body portion 66 having an outwardly-extending circumferential flange 68 at its normally upper end. This end is also bored inwardly to form the hollow cylindrical chamber 70.

Mounted on the lock pin 64 adjacent the flange 68 is an elongated substantially rectangular lock pin plate having a central opening 74, the pin 64 extending therethrough. It will be noticed that the center axis of the opening 74 is not perpendicular with respect to the planes of the top and bottom sides of the lock pin plate 72 and the bore forms top and bottom stop edges 76, 78. One end of the plate 72 is provided with an aperture 80 that pivotally receives the eye 82 of a wire guard 84. The wire guard 84 includes a normally upright bight 86 from the ends of which project laterally-offset arms 88, 90, respectively. The arms 88, 90 are parallel and the outer end of the arm 88 terminates in the eye 82. The outer end of the arm 90 terminates in an eye 92, the eyes 82, 90 being disposed in planes perpendicular to one another. As is seen in FIGURES 1 and 2, the eye 92, in its operative position embracingly engages about the lower end of the lock pin 64.

Fixedly mounted on the lock pin 64, as by welding, (not shown) is a washer 94 that normally engages the upper side of the tongue 60. Loosely surrounding the upper end of the lock pin 64 is a helicoidal spring 96 which is interposed between the plate 72 and the washer 94. As is clearly shown in FIGURES 2 and 4, the spring 96 constantly biases the lock plate 72 for longitudinal axial movement relative to the lock pin 64 upwardly thereof. The arrangement is such that the upper end of the spring 96 cants the plate 72 at an angle relative to the longitudinal axis of the lock pin 64 whereby the stop edges 76, 78 engage the main body portion 66 to "bite" therein in such a manner as to resist longitudinal movement of the lock pin 64 in the bore 62 and opening 56.

In a study of FIGURES 2, 3 and 5, it will be seen that the lock pin 64 can only be removed from the bore 62 and opening 56 when the operator exerts downward pressure on the opposed ends of the lock plate 72 in the direction of the arrows shown in FIGURE 3, and in such mannr as to coaxially align the axis of the opening 74 with the longitudinal axis of the lock pin 66. This movement causes the eye 92 to escape from the lower end of the lock pin 64 whereby the bight 86 and the arms 88, 90 may be pivoted from their full-line position shown in FIGURE 3 to their dotted-line positions. The lock pin 64 may now be removed together with its associated washer 94 and spring, as a unit. To insert the lock pin 64, it is only necessary to pass it through the bore 62 until the washer engages the upper side of the tongue 60, and through the selected one of the openings 56. The lock plate 72 is again depressed in the direction of the arrows shown in FIGURE 3, and the bight 86 and arms 88, 90 are pivoted from the dotted-line position in FIGURE 3 to its full-line position shown therein with the eye 92 loaxially aligned with the lock pin 64. Thereafter, pressure exerted on the plate 72 is relaxed and the spring 96 pushes the plate 72 upwardly to raise the eye 92 on the main body portion 66 of the lock pin 64. With the relaxing of the pressure on the plate 72, the helicoidal spring 96 tends to cant the plate 72 in such a manner as to effect engagement of the edges 76, 78 of the opening or bore 74. This will serve to maintain the pin in its coupler capacity.

Having described and illustrated one embodiment of this invention in detail, it will be understood that the same is offered merely by way of example, and that this invention is to be limited only by the scope of the appended claims.

What is claimed is:

1. An attachment for the lock pin coupling the drawbar of an automotive vehicle with the tongue of a vehicle to be drawn, said drawbar having an opening extending therethrough and said tongue having a bore extending transversely therethrough, said opening and said bore being aligned to receive said lock pin therein, a substantially flat rectangular lock plate having an opening extending transversely therethrough, said last-named opening being formed on an axis other than perpendicular to the plane of either side of said lock plate to form edges engageable with said lock pin when said plate is canted, a helicoidal spring surrounding said lock pin with one end engaging said lock plate to effect said canting of said lock plate, a washer fixedly mounted on said lock pin to engage said tongue and to bear against the other end of said spring, and means connecting said lock plate with said lock pin including an element pivotally connected with said lock plate to pivot across and span said tongue and drawbar and to releasably embracingly engage said pin.

2. An attachment as defined in claim 1, wherein said element includes a bight from the opposed ends of which, respectively, laterally projects an arm, means pivotally connecting one of said arms with said lock plate, and means on the other of said arms to slidably embrace said lock pin.

3. An attachment as defined in claim 2, wherein said means pivotally connecting said one arm comprises an eye formed at the outer end thereof, and said means slidably connecting the other arm with said lock pin comprises a second eye.

4. An attachment as defined in claim 3, wherein said eyes are disposed perpendicular with respect to one another.

References Cited by the Examiner
UNITED STATES PATENTS

| | | | |
|---|---|---|---|
| 766,145 | 7/04 | Greer | 24—243.12 |
| 836,303 | 11/06 | Christensen | 24—243.12 |
| 2,525,471 | 10/50 | Balyer | 280—515 X |
| 3,011,801 | 12/61 | Neumann | 280—515 |
| 3,137,511 | 6/64 | Weil et al. | 280—36 X |

BENJAMIN HERSH, *Primary Examiner.*

A. HARRY LEVY, *Examiner.*